US011197225B2

United States Patent
Osaki (10) Patent No.: US 11,197,225 B2
(45) Date of Patent: Dec. 7, 2021

(54) COMMUNICATION DEVICE, COMMUNICATION METHOD, AND PROGRAM

(71) Applicant: AITRAX CO., LTD., Kanagawa (JP)

(72) Inventor: Kuninori Osaki, Kanagawa (JP)

(73) Assignee: AITRAX CO., LTD., Kanagawa (JP)

( * ) Notice: Subject to any disclaimer, the term of this patent is extended or adjusted under 35 U.S.C. 154(b) by 37 days.

(21) Appl. No.: 16/619,643

(22) PCT Filed: Jan. 25, 2019

(86) PCT No.: PCT/JP2019/002521
§ 371 (c)(1),
(2) Date: Dec. 5, 2019

(87) PCT Pub. No.: WO2019/146764
PCT Pub. Date: Aug. 1, 2019

(65) Prior Publication Data
US 2020/0100164 A1     Mar. 26, 2020

(30) Foreign Application Priority Data

Jan. 25, 2018 (JP) .............................. JP2018-010944
Sep. 4, 2018 (JP) .............................. JP2018-165445

(51) Int. Cl.
| | |
|---|---|
| *H04W 40/12* | (2009.01) |
| *H04B 17/318* | (2015.01) |
| *H04W 24/08* | (2009.01) |
| *H04W 84/12* | (2009.01) |
| *H04W 84/18* | (2009.01) |
| *H04W 88/06* | (2009.01) |

(52) U.S. Cl.
CPC .......... *H04W 40/12* (2013.01); *H04B 17/318* (2015.01); *H04W 24/08* (2013.01);
(Continued)

(58) Field of Classification Search
CPC ..... H04W 40/12; H04W 24/08; H04W 84/18; H04W 88/06; H04B 17/318
See application file for complete search history.

(56) References Cited

U.S. PATENT DOCUMENTS

| | | | |
|---|---|---|---|
| 2005/0206554 A1 | 9/2005 | Yamaura | |
| 2009/0285124 A1* | 11/2009 | Aguirre | ................. H04W 40/24 370/255 |

(Continued)

FOREIGN PATENT DOCUMENTS

| | | |
|---|---|---|
| JP | 2004-282268 | 10/2004 |
| JP | 2005-223865 | 8/2005 |

(Continued)

OTHER PUBLICATIONS

International Search Report issued in International Patent Application No. PCT/JP2019/002521, dated Mar. 26, 2019.
(Continued)

*Primary Examiner* — Jamal Javaid
*Assistant Examiner* — Ryan C Kavleski
(74) *Attorney, Agent, or Firm* — Greenblum & Bernstein, P.L.C.

(57) ABSTRACT

A communication device includes: a storing part storing a definition table where a reception power and a metric value are associated with each other, and a cumulative metric value; a receiving part that receives a broadcast signal transmitted from another communication device; a calculating part that acquires a metric value corresponding to a reception power of the broadcast signal received by the receiving part from the definition table, and calculates a cumulative metric value based on the acquired metric value and a metric value included in the received broadcast signal; and a determining part that updates a cumulative metric value stored in the storing part to the calculated cumulative metric value if the calculated cumulative metric value is
(Continued)

smaller than the cumulative metric value stored in the storing part, and determines the other communication device transmitting the broadcast signal of the calculated cumulative metric value as a route construction target.

11 Claims, 9 Drawing Sheets

(52) U.S. Cl.
CPC ............ *H04W 84/12* (2013.01); *H04W 84/18* (2013.01); *H04W 88/06* (2013.01)

(56) References Cited

U.S. PATENT DOCUMENTS

| | | | |
|---|---|---|---|
| 2012/0320781 A1* | 12/2012 | Furukawa | H04W 40/14 370/252 |
| 2013/0252640 A1 | 9/2013 | Kenney et al. | |
| 2017/0086211 A1* | 3/2017 | Sahin | H04W 48/16 |

FOREIGN PATENT DOCUMENTS

| | | |
|---|---|---|
| JP | 2008-124813 | 5/2008 |
| JP | 2011-030049 | 2/2011 |
| WO | 2011/105371 | 9/2011 |

OTHER PUBLICATIONS

Tang S et al: "A Link Heterogeneity awareon-Demand Routing (LHAOR) Protocol Utilizing Local Update and RSSI Information", IEICE Transaction on Communication, Communications Society, Tokyo, JP, vol. E88-B, No. 9, Sep. 1, 2005 (Sep. 1, 2005), pp. 3588-3597, XP001234286, ISSN: 0916-8516, DOI: 10.1093/IETCOM/ E88-B.9.3588* section 3.1-3.2*.

* cited by examiner

| Rreception power | Metric (Case 1) | Metric (Case 2) | Comment |
|---|---|---|---|
| 0dBm | 0 | 0 | Radio wave intensity is sufficiently high, and therefore, multistage relay is not required (direct connection is efficient transfer) |
| -1dBm | 1 | 1 | |
| -2dBm | 1 | 1 | |
| -3dBm | 2 | 2 | |
| -4dBm | 2 | 2 | |
| ... | ... | ... | |
| -20dBm | 5 | 5 | |
| -21dBm | 5 | 5 | |
| -22dBm | 5 | 5 | |
| -23dBm | 5 | 5 | |
| -24dBm | 5 | 5 | |
| -25dBm | 6 | 6 | |
| -26dBm | 6 | 6 | |
| -27dBm | 6 | 6 | |
| -29dBm | 6 | 6 | |
| ... | ... | ... | |

| Rreception power | Metric (Case 1) | Metric (Case 2) | Comment |
|---|---|---|---|
| -45dBm | 50 | 50 | There is sufficient radio wave intensity, and therefore, multistage relay should not be performed in this region |
| -46dBm | 50 | 50 | |
| -47dBm | 53 | 53 | |
| -48dBm | 53 | 53 | |
| -48dBm | 54 | 54 | |
| ... | ... | ... | |
| -60dBm | 500 | 100 | The speed and radio wave intensity are balanced, and therefore, multistage relay route greatly changes by operating this value |
| -61dBm | 600 | 125 | |
| -62dBm | 600 | 150 | |
| -63dBm | 700 | 200 | |
| -64dBm | 700 | 250 | |
| ... | ... | ... | |
| -96dBm | 1000000 | 1000000 | Speed hardly changes even if connected, and therefore, not connecting is preferable |
| -97dBm | 1000000 | 1000000 | |
| -98dBm | 1000000 | 1000000 | |
| -99dBm | 1000000 | 1000000 | |

COMMUNICATION DEVICE, COMMUNICATION METHOD, AND PROGRAM

CROSS-REFERENCES TO RELATED APPLICATIONS

The present application is based on Japanese Application No. (Patent Application) 2018-010944 filed on Jan. 25, 2018 and Japanese Application No. (Patent Application) 2018-165445 filed on Sep. 4, 2018, and a description thereof is incorporated herein by reference.

TECHNICAL FIELD

The present invention relates to a communication device, a communication method, and a program.

BACKGROUND TECHNOLOGY

IEEE 802.11s, for example, is known as a route constructing technique in a wireless multistage relay (for example, Patent Document 1). Communication devices can be mutually connected to configure a wireless mesh network by using IEEE 802.11s.

PRIOR TECHNOLOGY DOCUMENTS

Patent Documents

Patent Document 1: JP 2008-124813 A

SUMMARY OF THE INVENTION

Problem to be Solved by the Invention

Using IEEE 802.11s, a communication route is determined based on a weighted value referred to as a metric, which indicates a cost for each route between communication devices. IEEE 802.11s emphasizes compatibility between mutually connected communication devices. For example, a metric value is determined based on a theoretical maximum communication speed determined by a communication standard, so as to be able to cope with an environment where communication devices with different communication standards such as IEEE 802.11a, IEEE 802.11ac, or the like are mixed.

Herein, communication is not necessarily performed at a theoretical maximum communication speed during wireless communication. For example, wireless communication is affected by a surrounding radio wave environment. Therefore, the communication speed is adjusted to an optimal speed after communication is started and then a certain number of frames are exchanged. Therefore, when the amount of transmitted and received frames is low, such as after turning the power ON or the like, an actual optimal transmission rate cannot be achieved. Thus, a route constructed using a metric calculating method using a theoretical maximum communication speed as described above is not optimal. In particular, when constructing a tree-type route, the route must be determined before a user can start transmitting and receiving frames. Therefore, considering when a relaying device moves or the like, route construction by a metric using a theoretical maximum communication speed defined by a standard specification is not an optimal method.

Therefore, an object of the present invention is to provide technology that enables more optimal route construction in a wireless mesh network.

Means for Solving Problems

A communication device according to one aspect of the present invention is a communication device in a communication system that supports a wireless mesh network using a wireless LAN, provided with: a storing part that stores a definition table where a reception power and a metric value are associated with each other, and a cumulative metric value; a receiving part that receives a broadcast signal transmitted from another communication device; a calculating part that acquires a metric value corresponding to a reception power of the broadcast signal received by the receiving part from the definition table, and then calculates a cumulative metric value based on the acquired metric value and a metric value included in the received broadcast signal; and a determining part that updates a cumulative metric value stored in the storing part to the calculated cumulative metric value if the calculated cumulative metric value is smaller than the cumulative metric value stored in the storing part, and determines the other communication device transmitting the broadcast signal of the calculated cumulative metric value as a route construction target in the wireless mesh network.

Effect of the Invention

The present invention can provide technology that enables more optimal route construction in a wireless mesh network.

DESCRIPTION OF THE PREFERRED EMBODIMENTS

A preferred embodiment of the present invention will be described while referring to the attached drawings. Note that in the drawings, components with the same symbol have the same or a similar configuration.

System Configuration

Figure 1:
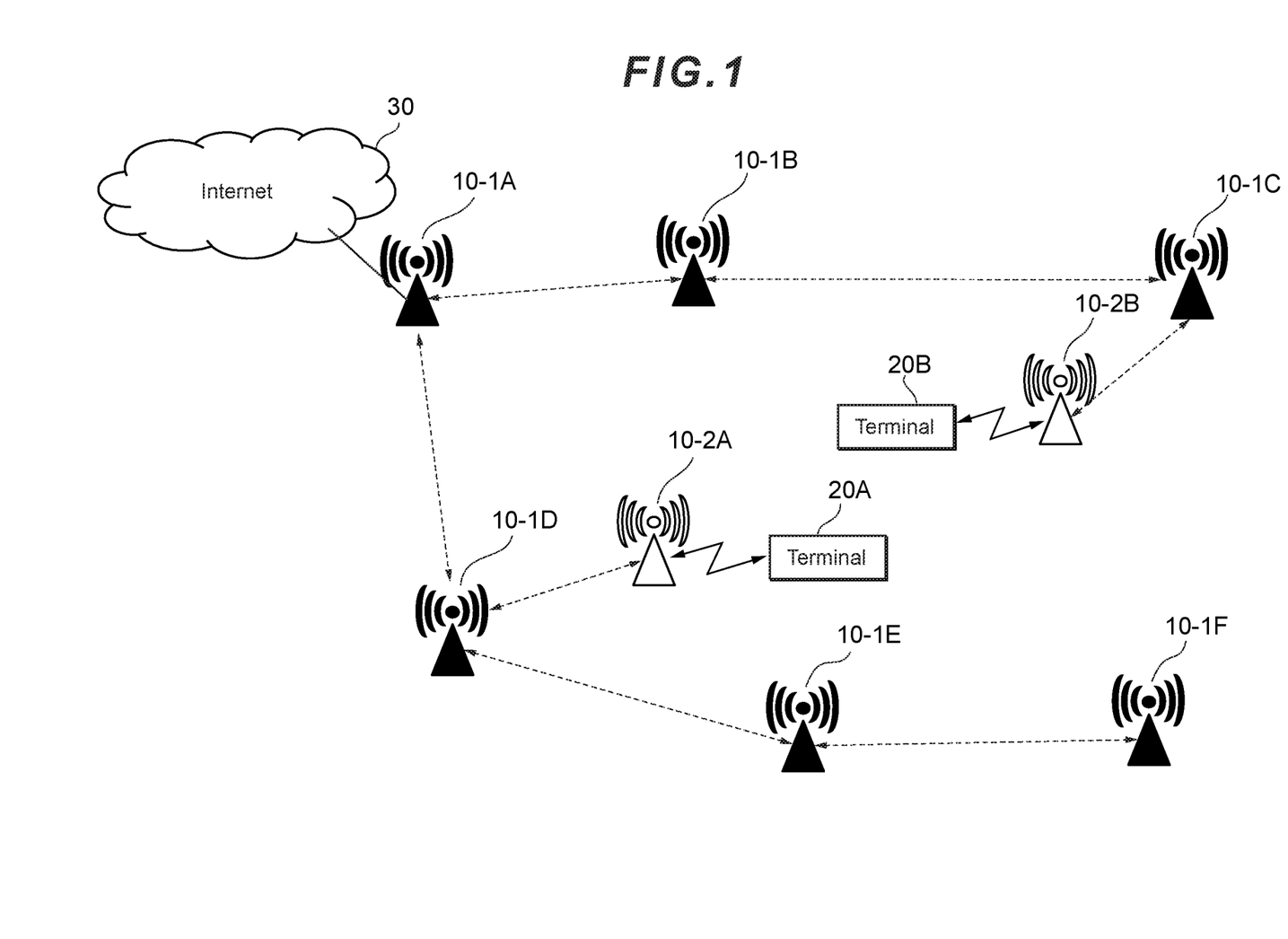
FIG. 1 is a diagram illustrating an example of a system configuration of a wireless communication system according to an embodiment.

FIG. 1 is a diagram illustrating an example of a system configuration 1 of a wireless communication system according to the embodiment. The wireless communication system 1 contains relaying devices 10-1A to 10-1F serving as fixed stations and relaying devices 10-2A and 10-2B serving as mobile stations. The relaying devices 10-1A to 10-1F serving as fixed stations are referred to as a "relaying device (fixed station) 10-1" when not particularly distinguished. The relaying devices 10-2A and 10-2B serving as mobile stations are referred to as a "relaying device (mobile station) 10-2" when not particularly distinguished. Furthermore, the relaying device (fixed station) 10-1 and relaying device (mobile station) 10-2 are referred to as "relaying device 10" when not particularly distinguished. The number of relaying devices (fixed station) 10-1 and relaying device (mobile station) 10-2 included in the wireless communication system 1 is arbitrary and is not particularly limited. Furthermore, the relaying device 10 may be referred to as "wireless relaying device" or "communication device".

The relaying device (fixed station) 10-1 basically does not move, and is intended as a relaying device 10 fixedly installed inside a building, outdoors, or the like. Furthermore, the relaying device (mobile station) 10-2 is intended as a relaying device 10 that is assumed to basically move, for example, mounted in an automobile or the like or owned by a user.

The relaying device (fixed station) 10-1 and relaying device (mobile station) 10-2 operate as access points and can communicate with a terminal 20 via a wireless LAN, LPWA (Low-Power Wide-Area Network), Bluetooth (registered trademark), wired LAN, or the like. Examples of the terminal 20 include smartphones, tablet terminals, portable telephones, personal computers (PC), notebook PCs, personal digital assistant (PDA), home video game consoles, and the like. In the example in FIG. 1, a terminal 20A communicates with the relaying device (mobile station) 10-2A, and a terminal 20B communicates with the relaying device (mobile station) 10-2B. The example in FIG. 1 is merely an example, and the terminal 20 can communicate with the relaying device (fixed station) 10-1.

Furthermore, the relaying device (fixed station) 10-1 and relaying device (mobile station) 10-2 support IEEE 802.11s, and construct a route in accordance with a procedure defined in IEEE 802.11s such that a wireless mesh network is configured by the entire wireless communication system 1. Dotted lines in FIG. 1 indicate routes constructed between the relaying devices 10. With the IEEE 802.11s, a standard called HWMP (Hybrid Wireless Mesh Protocol) is adopted. HWMP includes RM-AODV (On demand routing is based on Radio Metric AODV) where the relaying devices 10 autonomously construct a network, and a Pro-active routing method where a tree-type network is constructed using a specific relaying device as a starting point. With IEEE 802.11s, a communication route is determined for a weighted value indicating a cost per route between the relaying device 10, which is referred to as a metric. The present embodiment can be applied to the route constructing method used in both methods.

Figure 2:
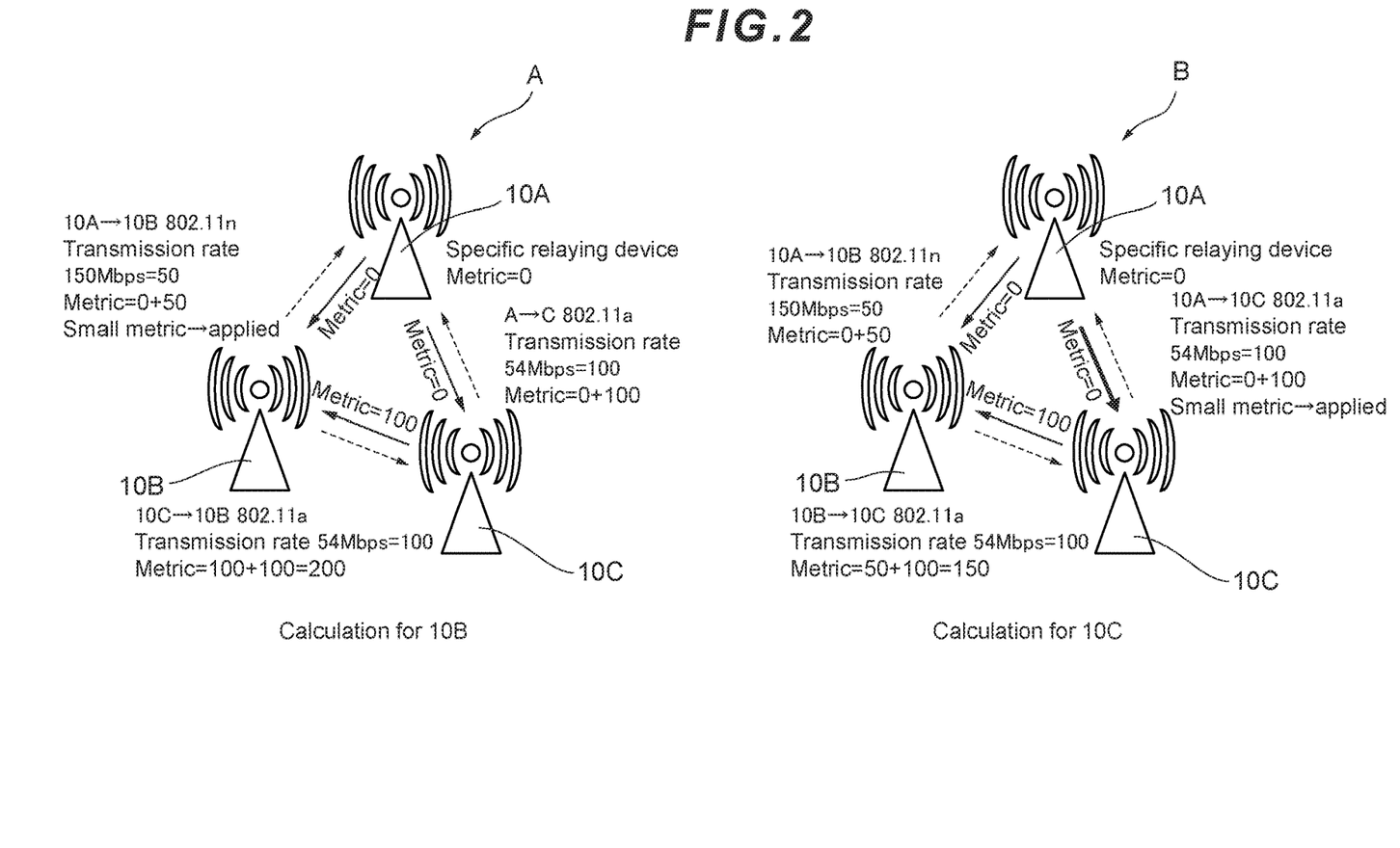
FIG. 2 is a diagram illustrating a route constructing system in a conventional IEEE 802.11s.

FIG. 2 is a diagram illustrating a conventional route constructing system using IEEE 802.11s. With this method, first, a route constructing frame with a metric value of 0 is transmitted (broadcast) from a specific relaying device 10 serving as a starting point (for example, a relaying device 10 serving as a communication starting point, connected to the Internet or the like; relaying device (fixed station) 10-1A in the example in FIG. 1). Next, a peripheral relaying device 10 calculates a metric value included in the received route constructing frame, and a metric value obtained by adding a metric value based on a theoretical maximum communication speed when communicating with the relaying device 10 that transmitted the route constructing frame (hereinafter, referred to as "cumulative metric value").

The metric value indicates the cost in the communication route, and therefore, the value is set to be smaller as the communication speed increases. In the example in FIG. 2, it is assumed that the metric value is 100 when the theoretical maximum communication speed is 54 Mbps (for example, for IEEE 802.11a), and the metric value is 50 when the theoretical maximum communication speed is 150 Mbps (for example, for IEEE 802.11n). The cumulative metric value can be also be said to indicate a total cost of the route from the relaying device 10 serving as a starting point in a wireless mesh network.

FIG. 2A illustrates a processing example when a relaying device 10B attempts to construct a route with another relaying device 10. In the case of FIG. 2A, a metric value included in the route constructing frame transmitted from a relaying device 10A is 0, and a metric value included in the route constructing frame transmitted from a relaying device 10C is 100. Furthermore, a theoretical maximum communication speed between the relaying device 10A and relaying device 10B is 150 Mbps, and a theoretical maximum communication speed between the relaying device 10B and relaying device 10C is 54 Mbps. Furthermore, in FIG. 2A, the relaying device 10A and relaying device 10C are in a condition where mutual communication is possible.

The relaying device 10B calculates a metric value when a route is constructed with the relaying device 10A by adding together a metric value included in the route constructing frame transmitted from the relaying device 10A and a metric value 50 corresponding to the theoretical maximum communication speed of 150 Mbps between the relaying device 10A and relaying device 10B. In this case, the metric value is 0+50=50. Similarly, the metric value when the relaying device 10B constructs a route with the relaying device 10C is 100+100=200. Therefore, the relaying device 10B constructs a route with the relaying device 10A having a small metric value.

FIG. 2B illustrates a processing example when a relaying device 10C attempts to construct a route with another relaying device 10. Furthermore, in FIG. 2B, the relaying device 10A and relaying device 10B are in a condition where mutual communication is possible.

Other points not specifically mentioned are the same as in FIG. 2A. In this case, the metric value when the relaying device 10C constructs a route with the relaying device 10B is 50+100=15. Similarly, the metric value when the relaying device 10C constructs a route with the relaying device 10A is 0+100=100. Therefore, the relaying device 10C constructs a route with the relaying device 10A having a small metric value.

In the present embodiment, assuming that the same communication method is used in all relaying devices, a reception power of radio waves is used for calculating a metric value in place of the theoretical maximum communication speed of the relaying device.

Note that in the present embodiment, an indicator other than the reception power may be used as an indicator indicating the quality of radio waves. For example, an indicator indicating reception strength (RSSI (Received Signal Strength indicator) may be used, or an SNR (Signal to Noise Ratio) may be used.

Furthermore, the relaying device (mobile station) 10-2 is assumed to move, and therefore, when the relaying device (mobile station) 10-2 is included in a midway point of a route, the route may frequently switch. When the route switching occurs at various points in the wireless mesh network, communication quality of the entire network deteriorates, which is not preferable.

Therefore, in the present embodiment, the relaying device (mobile station) 10-2 performs control so as to not transmit the route constructing frame such that the relaying device (mobile station) 10-2 is not present at a midway point of the route (in the example in FIG. 1, relaying devices 10-1B, 10-1D, and 10-1E).

Herein, a summary of the route constructing method performed by the relaying device 10 according to the present invention will be described. First, the device serving as a starting point of route construction is referred to as a route node. In the present embodiment, the relaying device (fixed station) 10-1A connected to the Internet is the route node. The route node transmits a route constructing frame with a metric value set to 0 at a predetermined period. Furthermore, each time a route constructing frame is transmitted at a predetermined period, a sequence number (initial value is 0) included in the route constructing frame is counted up.

On the other hand, a relaying device 10 other than the route node is referred to as an MP (mesh portal, mesh point). When the MP newly receives a route constructing frame from another relaying device 10 (including both the root node and MP), a sequence number of a route constructing frame received previously from another relaying device 10 (including both the route node and MP) is compared with a sequence number included in the newly received route constructing frame.

When the sequence number included in the newly received route constructing frame and the sequence number in the previously received route constructing frame are the same, the following processes (1) to (3) are performed.

(1) Determine whether or not the cumulative metric value calculated based on the newly received route constructing frame is a value smaller than a cumulative metric value stored in its own memory.

(2) If the value is determined to be small, update the cumulative metric value stored in its own memory to the cumulative metric value calculated based on the newly received route constructing frame, and broadcast the route constructing frame containing the cumulative metric value and the same sequence number as the sequence number included in the newly received route constructing frame.

(3) If the value is determined to not be small (in other words, the value is the same or large), end the process without updating the cumulative metric value and broadcasting the route constructing frame.

On the other hand, when the sequence number included in the newly received route constructing frame and the sequence number in the previously received route constructing frame are different, the cumulative metric value stored in its won memory is updated to a maximum value. After updating to the maximum value, the same processes (1) to (3) are performed (however, the cumulative metric value is not updated to a maximum value, and therefore, the process of (3) is normally not performed).

Based on the processing procedure, when the relaying device 10 serving as the route node transmits a route constructing frame, the relaying device 10 serving as the MP receiving the frame temporarily updates the cumulative metric value to a maximum value and recalculates the cumulative metric. Furthermore, when the relaying devices 10 are densely packed, a route constructing frame is directly transmitted and received between the relaying devices 10 serving as MPs, and a route having a smaller cumulative metric value is selected. In other words, each time that the route node transmits a route constructing frame, more optimal route construction can be performed even if a wireless status in the network changes due to the route in the network being updated to an appropriate condition based on the wireless status.

Hardware Configuration

Figure 3:
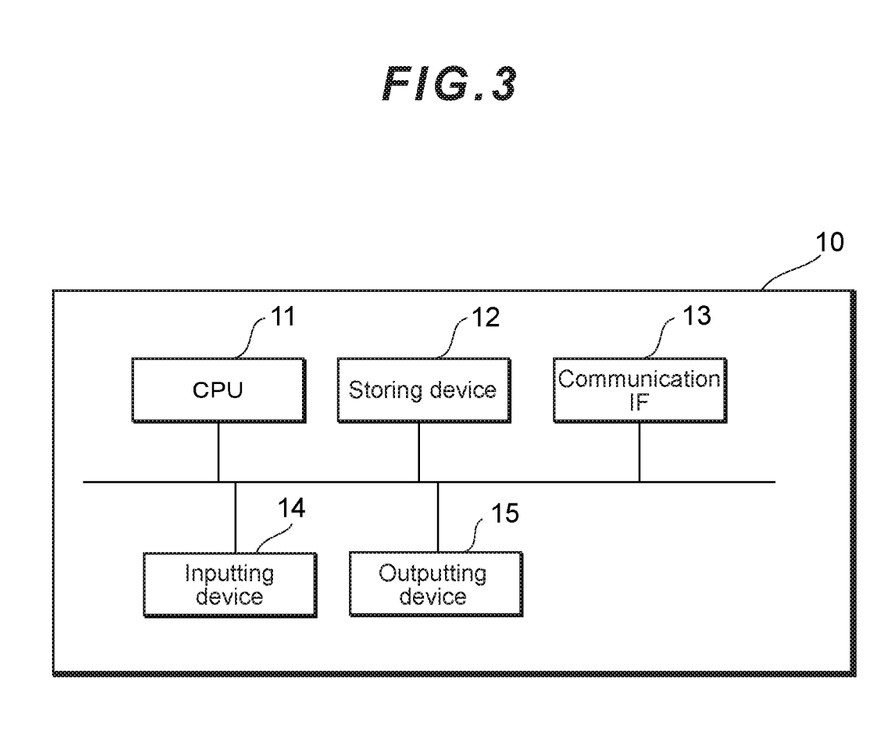
FIG. 3 is a diagram illustrating a hardware configuration example of a relaying device.

FIG. 3 is a diagram illustrating a hardware configuration example of the relaying device 10. The relaying device 10 is provided with: a CPU 11 (Central Processing Unit) 11; a memory; a storing device 12 such as an HDD (Hard Disk Drive) and/or SSD (Solid State Drive) or the like; a communication IF (Interface) 13 that performs wired or wireless communication; an inputting device 14 that receives an input operation; and an outputting device 15 that outputs information. The inputting device 14 is a switch, keyboard, touch panel, mouse, and/or microphone or the like for example. The outputting device 15 is an LED (Light-Emitting Diode), display, and/or speaker or the like for example.

Functional Block Configuration

Figure 4:
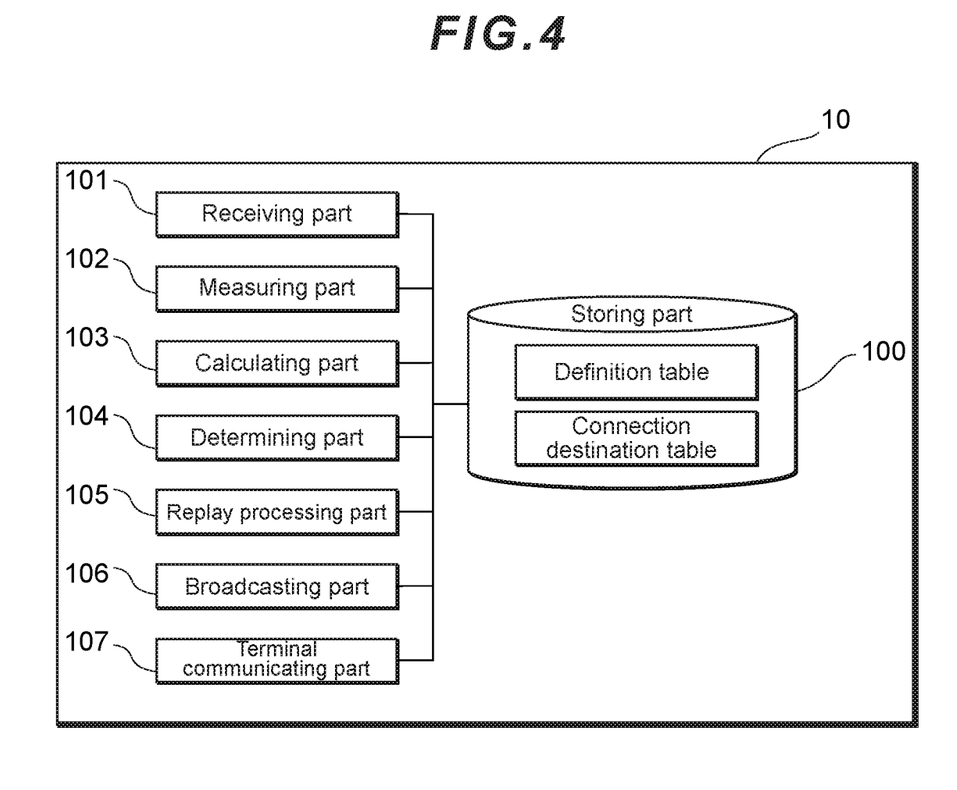
FIG. 4 is a diagram illustrating a functional block configuration example of the relaying device.

FIG. 4 is a diagram illustrating a functional block configuration example of the relaying device 10. The relaying device 10 contains a storing part 100, a receiving part 101, a measuring part 102, a calculating part 103, a determining part 104, a relay processing part 105, a broadcasting part 106, and a terminal communicating part 107. The receiving part 101, measuring part 102, calculating part 103, determining part 104, relay processing part 105, broadcasting part 106, and terminal communicating part 107 can be can be implemented by the CPU 11 of the relaying device 10 executing a program stored in the storing device 12. Furthermore, the program can be stored in a storing medium. The storing medium stored in the program may be a non-transitory computer readable storing medium. The non-transitory storing medium is not particularly limited, and may be a storing medium such as a USB memory, CD-ROM, or the like for example. Furthermore, the storing part 100 can be implemented using the storing device 12 provided by the relaying device 10.

Figure 5:
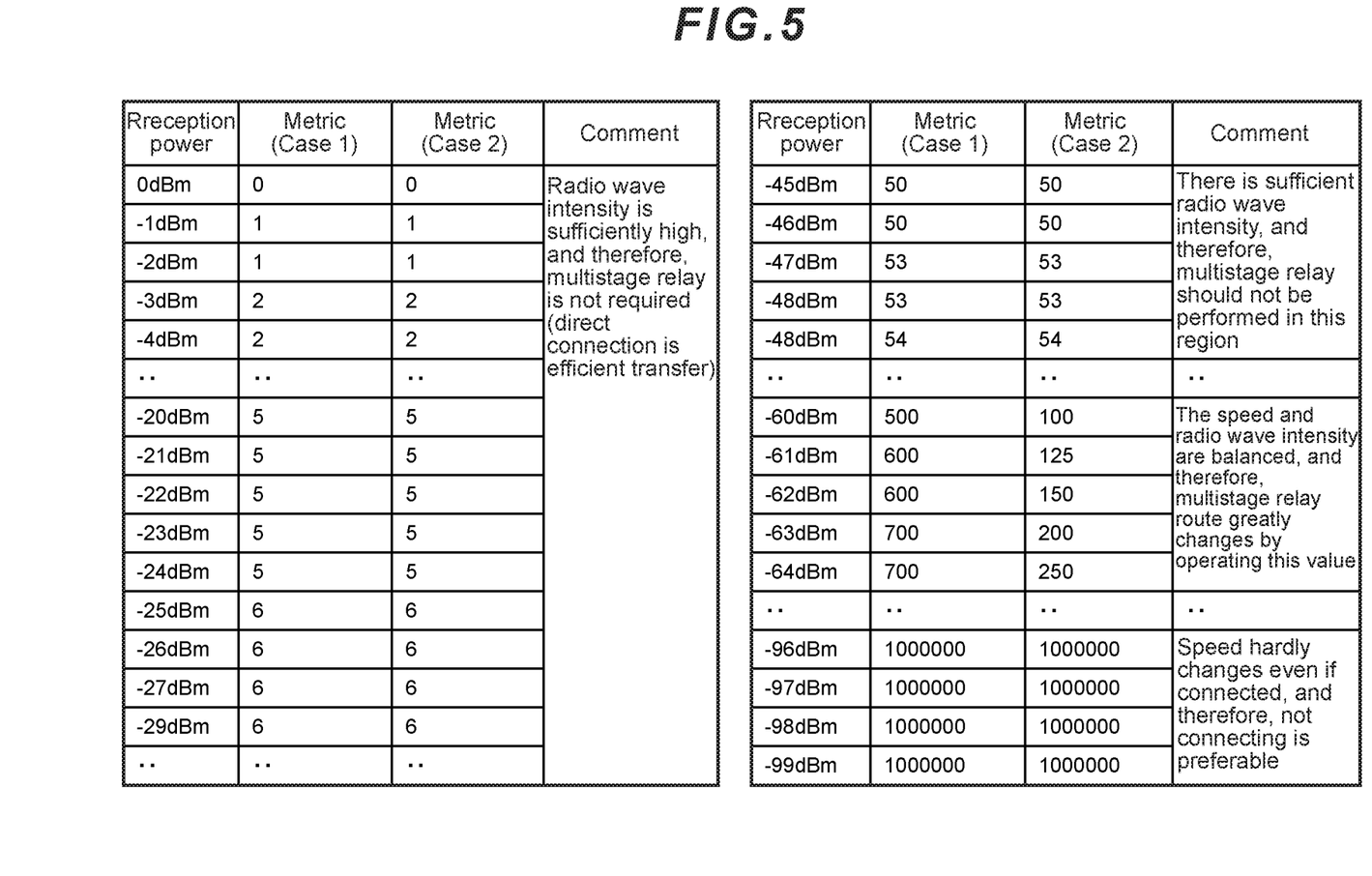
FIG. 5 is a diagram showing an example of a definition table.

The storing part 100 stores a definition table where reception power and a metric value are associated with each other. Furthermore, the storing part 100 stores a cumulative metric value. FIG. 5 is a diagram showing an example of a definition table. More specifically, FIG. 5 is a definition table where a metric value and reception power of radio waves in 1 dBm units are associated with each other. In the definition table shown in Table 5, two patterns of Metric (case 1) and Metric (case 2) are present. However, when calculating the metric value, a pattern designated by an external server or the like or a dip switch or the like may be used. The definition table may be referred to as reception power—Metric table. Note that the metric value may be allowed to be set to a very large value in consideration of a case where the signal strength of a radio wave is too weak and thus it is better to not connect the relaying device 10.

The receiving part 101 has a function of receiving a route constructing frame (broadcast signal) transmitted from another relaying device 10. Furthermore, when the receiving part 101 receives a route constructing frame with a different sequence number than a previously received route constructing frame, the cumulative metric value stored in the storing part 100 is updated to an initial value (maximum value possible for the cumulative metric value).

The measuring part 102 has a function of measuring the reception power of the route constructing frame received by the receiving part 101.

The calculating part 103 has a function of acquiring a metric value corresponding to the reception power measured by the measuring part 102 from the definition table for the route constructing frame received by the receiving part 101, and calculating a cumulative metric value by totaling the acquired metric value and metric value included in the received route constructing frame. Note that the cumulative metric value is not necessarily limited to a value totaling the acquired metric value and metric value included in the received route constructing frame. For example, the calculating part 103 may calculate the cumulative metric value by multiplying a value obtained by totaling the acquired metric value and the metric value included in the received route constructing frame by at least one predetermined constant value. Furthermore, the calculating part 103 may input the acquired metric value and metric value included in the received route constructing frame to a predetermined function, and use a value output from the predetermined function as the cumulative metric value. The predetermined function includes any function so long as the function outputs a value larger than each of the two input metric values. In other words, the calculating part 103 may calculate the cumulative metric value based on the acquired metric value and metric value included in the received route constructing frame.

Furthermore, the calculating part 103 may calculate the reception power of a broadcast signal received by the receiving part 101 by adding a reception power of a route constructing frame received in the past and reception power of a newly received route constructing frame at a predetermined ratio (more specifically, a primary filter or the like described later may be used).

The determining part 104 updates the cumulative metric value stored in the storing part 100 to the cumulative metric value calculated by the calculating part 103 if the calculated cumulative metric value is smaller than the stored cumulative metric value, and determines the other relaying device 10 transmitting the broadcast signal of the calculated cumulative metric value as a route construction target in the wireless mesh network.

The relay processing part 105 has a function of transmitting (transferring) data received from the other relaying device 10 or terminal 20 to the relaying device 10 determined by the determining part 104. Furthermore, the relay processing part 105 has a function of transmitting (transferring) data sent from the relaying device 10 determined by the determining part 104 to another relaying device 10 on the route or the terminal 20.

The broadcasting part 106 has a function of broadcasting the route constructing frame. More specifically, when the relaying device 10 operates as the MP, and when the cumulative metric value stored in the storing part 100 is updated to a small cumulative metric value, the route constructing frame containing a cumulative metric value of a small value after updating and a sequence number is broadcast. When the relaying device 10 operates as a route node, the route constructing frame with a cumulative metric value of zero is broadcast at a predetermined cycle while incrementing the sequence number.

Furthermore, the broadcasting part 106 may be controlled to broadcast the route constructing frame containing the cumulative metric value when the relaying device 10 operates as a fixed station, and to not broadcast throughout constructing frame containing the cumulative metric value when the relaying device 10 operates as a mobile station. Whether or not the relaying device 10 operates as a fixed station or operates as a mobile station may be determined based on a value of a flag stored in the storing part 100. Alternatively, the device may operate as a fixed station when a physical switch such as a dip switch or the like is set to a fixed station side, and operate as a mobile station when set to a mobile station side.

The terminal communicating part 102 has a function of directly communicating with the terminal 20 via a wireless LAN, Bluetooth (registered trademark), wired LAN, or the like.

Figure 6:
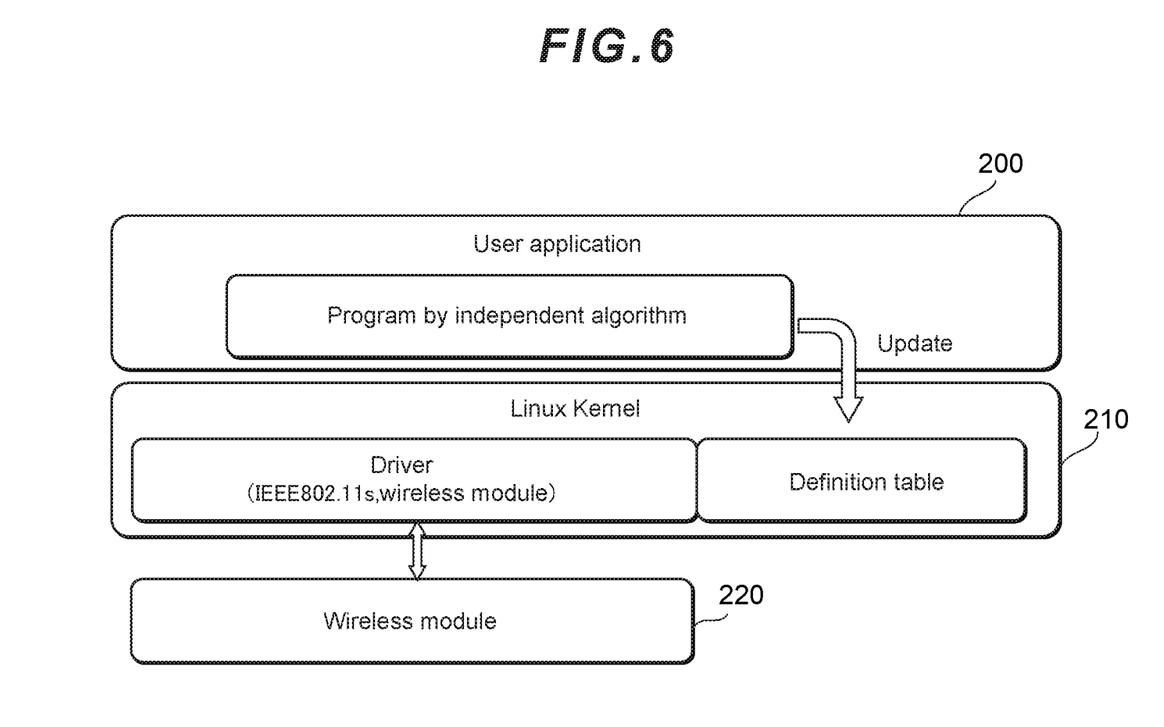
FIG. 6 is a diagram illustrating a device configuration of the relaying device.

FIG. 6 is a diagram illustrating a device configuration of the relaying device 10. The reeling device 10 may be configured from a user application 200, Linux Kernel 210, and wireless module 220. A program based on an independent algorithm for updating a definition table is included in the user application 200. Furthermore, a definition table as well as a driver for a wireless module that supports IEEE 802.11s are included in the Linux Kernel 210. Furthermore, the various functional parts described in FIG. 4 are also included in the Linux Kernel 210.

In order to increase the speed of route construction, the definition table may be referred inside a driver program of hardware that operates a wireless communication device. Calculation and determination of metric values in the definition table as well as writing to the table may be performed from the user application 200 and not inside the Linux kernel 210 as illustrated in FIG. 6. In addition to calculating a value of the definition table, the user application 200 may determine a value of the table based on a self-learning algorithm update value of the table in a constant cycle, in consideration of fluctuations in radio wave intensity, an amount of data relayed by the relaying device, or the like.

Furthermore, calculating decimal numbers in the Linux kernel 210 is difficult. Therefore, the table may be updated by performing decimal calculation such as logarithm or the like on the user application 200 side, and then the table may be referred to using the Linux kernel 210.

Processing Procedure

Figure 7:
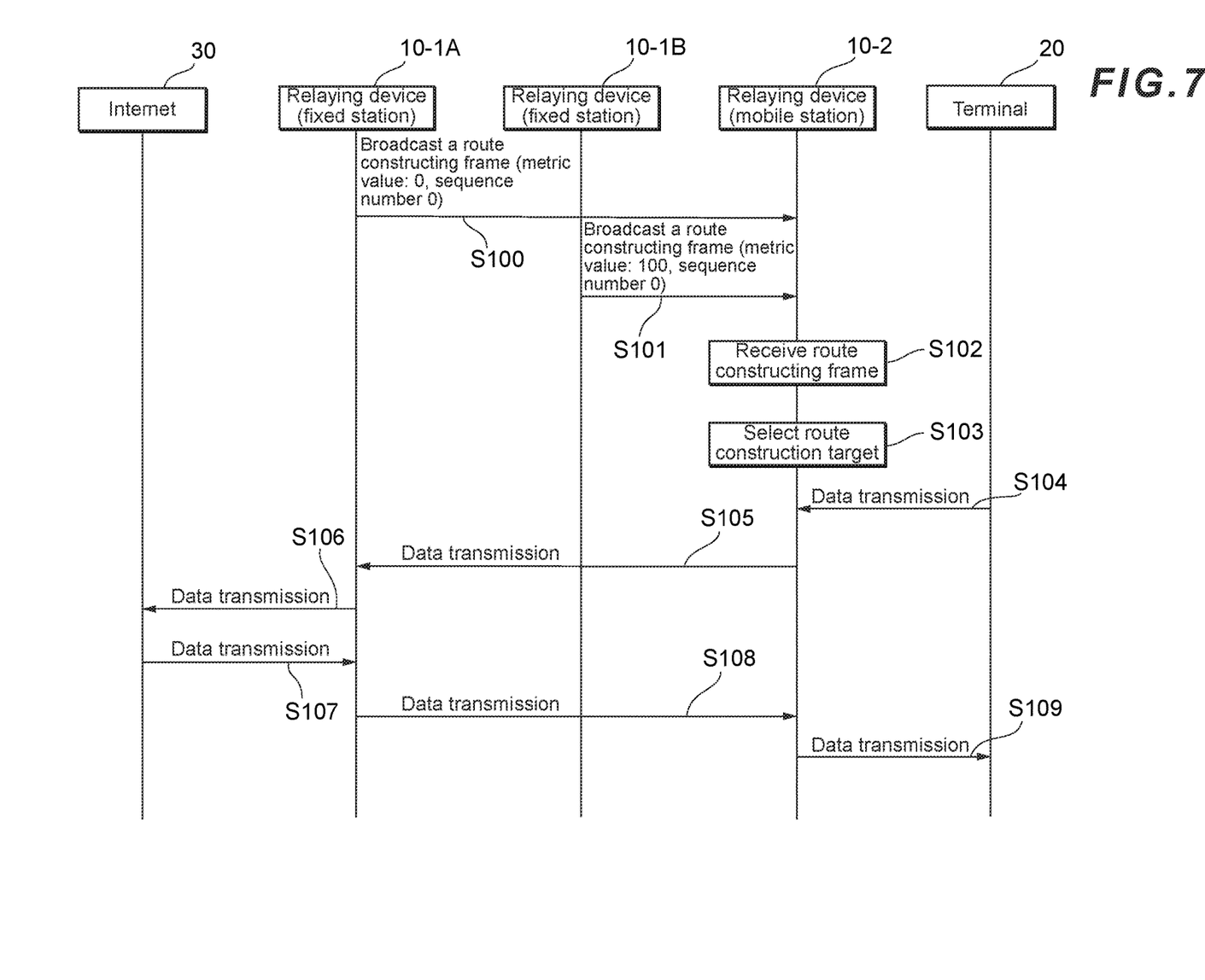
FIG. 7 is a diagram showing an example of a processing procedure performed by the wireless communication system according to the embodiment.

FIG. 7 is a diagram showing an example of a processing procedure performed by the wireless communication system according to the embodiment. FIG. 7 will be used to describe a series of processing procedures until the relaying device (mobile station) 10-2 constructs a new route between the relaying device (fixed station) 10-1A or relaying device (fixed station) 10-1B, and the terminal 20 transmits and receives data with the Internet 30. In the example in FIG. 7, the relaying device (fixed station) 10-1A is set as a route node.

First, the relaying device (fixed station) 10-1A and relaying device (fixed station) 10-1B broadcast a route constructing frame. A measured value 0 and sequence number 0 are included in the route constructing frame transmitted by the relaying device (fixed station) 10-1A, and a metric value 100 and sequence number 0 are included in the route constructing frame transmitted by the relaying device (fixed station) 10-1B (S100, S101).

The relaying device (mobile station)) 10-2 receives the route constructing frame broadcast from the relaying device (fixed station) 10-1A and route constructing frame broadcast from the relaying device (fixed station) 10-1B (S102). Next, the delaying device (mobile station) 10-2 determines either the relaying device (fixed station) 10-1A or relaying device (fixed station) 10-1B as a route construction target (S103). Herein, the relaying device fixed station) 10-1A is determined as the route construction target. The relaying device (mobile station) 10-2 stores an identifier (MAC address, SSID, or the like) for the relaying device (fixed station) 10-1A determined as the route construction target.

Next, the relaying device (mobile station) 10-2 receives data from the terminal 20 for the Internet 30 (S104). The relaying device (mobile station) 10-2 transfers the received data to the relaying device (fixed station) 10-1A determined in the step S103 processing procedure (S105). The relaying device (fixed station) 10-1 transmits the received data to the Internet 30 (S106).

Next, data is transmitted from the Internet 30 to the terminal 20. The relaying device (fixed station) 10-1A receiving the data transmits the data to the relaying device (mobile station) 10-2 (S107, S108). The relaying device (mobile station) 10-2 transmits the data to the terminal 20. Note that the data routing process in step 104 to step 109 is performed in accordance with the routing procedure defined in IEEE 802.11s.

Figure 8:
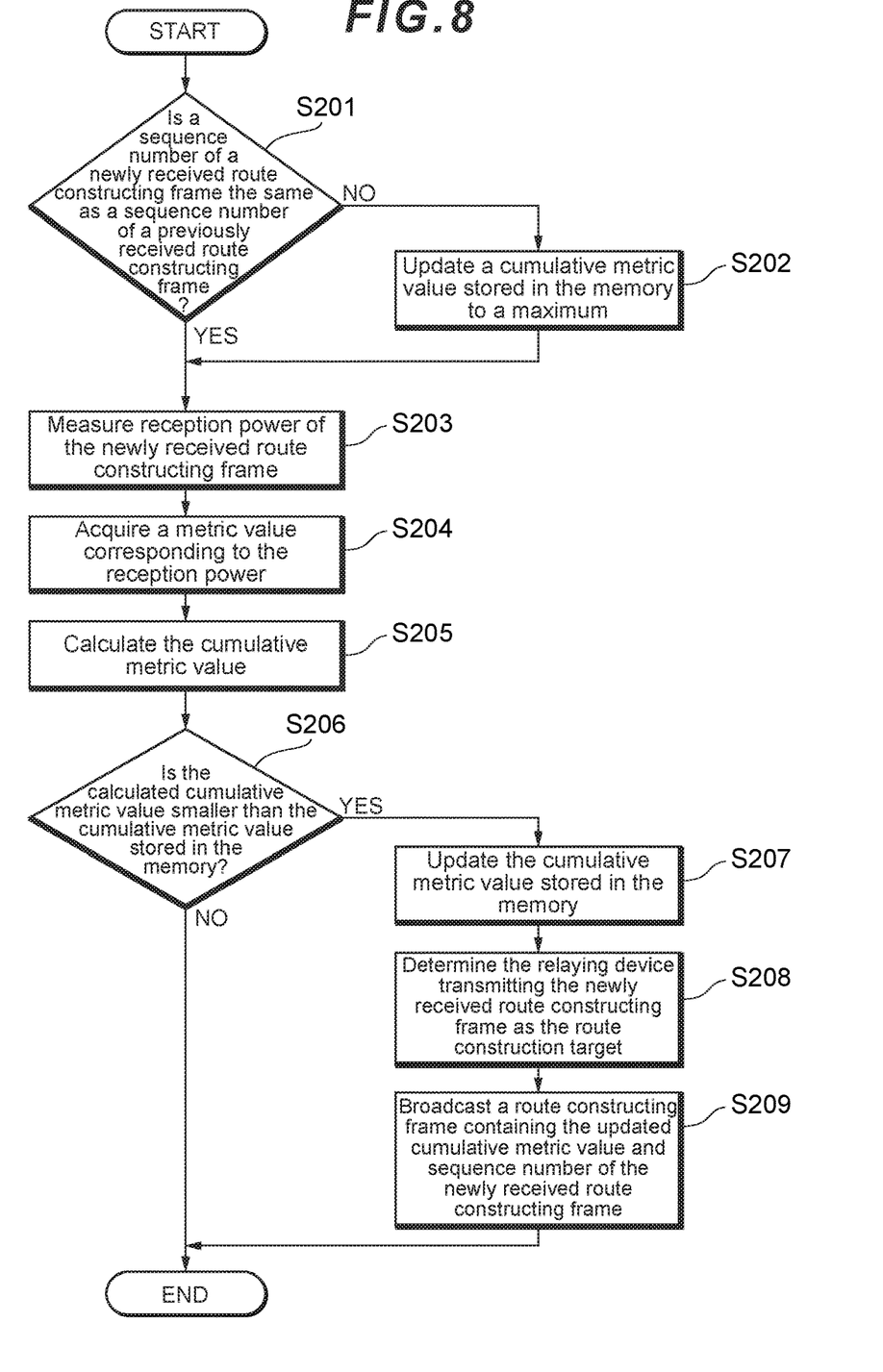
FIG. 8 is a flowchart showing an example of a processing procedure when the relaying device determines a relaying device of a route construction target.

FIG. 8 is a flowchart showing an example of a processing procedure when the relaying device 10 determines 1 relaying device 10 of a route construction target. A procedure in FIG. 8 corresponds to the processing procedure of step S103 in FIG. 7.

In step S201, the receiving part 101 of the relaying device 10 determines whether or not a sequence number of a newly received route constructing frame is the same as a sequence number of a previously received route constructing frame. If determined to be the same, the process proceeds to step S203. If determined to be different, the process proceeds to step S202.

In step S202, the receiving part 101 of the relaying device 10 updates a cumulative metric value stored in the storing part 100 (memory) to a maximum value.

In step S203, the measuring part 102 of the relaying device 10 measures reception power of the newly received route constructing frame. In step S204, the calculating part 103 of the relaying device 10 searches the definition table to acquire a metric value corresponding to the measured reception power. In step S205, the calculating part 103 of the relaying device 10 calculates the cumulative metric value by adding together the metric value included in the newly received route constructing frame and metric value acquired from the definition table.

In step S206, the determining part 104 determines whether or not the calculated cumulative metric value is smaller than the cumulative metric value stored in the storing part 100. If the value is small, the process proceeds to step S207, and if the value is the same or large, the process ends.

In step S207, the determining part 104 updates the cumulative metric value stored in the storing part 100 to the cumulative metric value calculated in step S205. In step S208, the determining part 104 determines the relaying device 10 transmitting the newly received route constructing frame, and stores an identifier of the determined relaying device 10 (MAC address, SSID, or the like). In step S209, the broadcasting part 106 broadcasts a route constructing frame containing the updated cumulative metric value and sequence of the newly received route constructing frame. Note that if the relaying device 10 is a mobile station, the broadcasting part 106 omits the step S209 processing procedure. In other words, the broadcasting part 106 is controlled to not broadcast the route constructing frame.

In the processing procedure described above, reception power fluctuates in a short time depending on the environment. Therefore, the measuring part 102 may perform measurements by introducing an averaging technique using a primary filter.

For example, if an averaged reception power set as Pave_old, a measured reception power set as Pnow, and averaged number set as N, an averaged reception power Pave may be calculated by the following equation.

$$P\text{ave}=(P\text{ave\_old} \times (N-1) + P\text{now})/N$$

Herein, N can be set to an arbitrary number. If N is set to a small value, the reception power of the newly received route constructing frame is greatly affected, which is suitable for an environment where the reception power frequently fluctuates. In other words, this is suitable for a case where the relaying device 10 operates as a mobile station.

Furthermore, if N is set to a large value, the reception power of a route constructing frame received in the past is greatly affected, and therefore can be used in stabilizing radio wave intensity for a fixed station. In other words, this is suitable for a case where the relaying device 10 operates as a fixed station.

Furthermore, by temporarily setting N=1 during operation, the averaged Pave can be initialized. Thereby, the averaged number N can be changed to an arbitrary value during operation of the system such that a primary filter time constant can be freely changed.

Furthermore, the measuring part 102 is not limited to the primary filter, and may use an another averaging technique. For example, the measuring part 102 may average reception power values for a predetermined number of times in the past.

Operation Example

Figure 9:
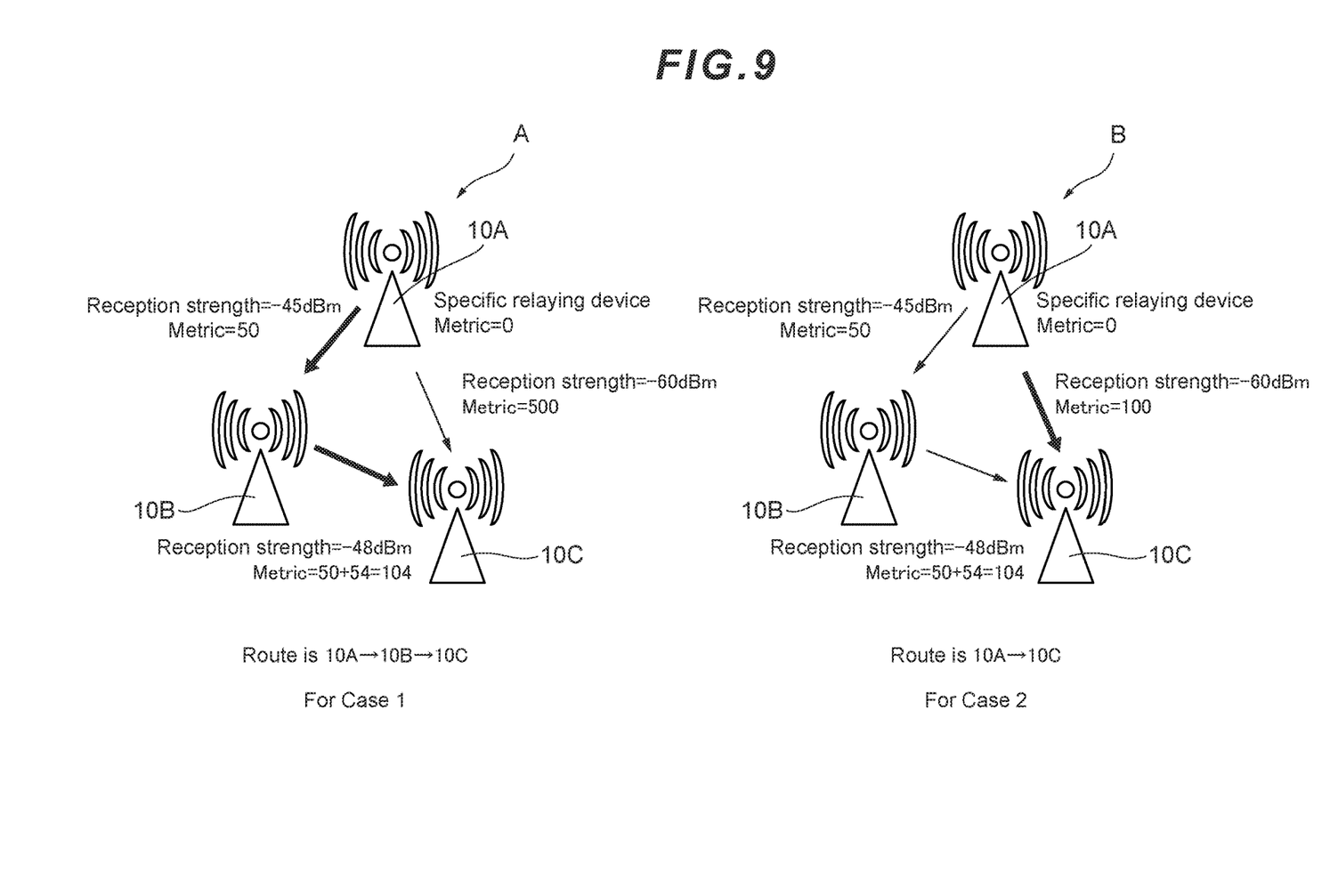
FIG. 9 is a diagram illustrating a concrete example of route construction performed by the relaying device.

FIG. 9 is a diagram illustrating a concrete example of route construction performed by the relaying device 10. FIG. 9A illustrates a processing example when the relaying device 10C attempts to construct a route with another relaying device 10. In FIG. 9, a metric value included in the route constructing frame transmitted from the relaying device 10A is 0, and a metric value included in the route constructing frame transmitted from the relaying device 10B is 50. Furthermore, the reception power of a route constructing frame received by the relaying device 10C from the relaying device 10B is −48 dBm, and the reception power of a route constructing frame received by the relaying device 10C from the relaying device 10A is −60 dBm. Furthermore, the relaying device 10A is a route node, and sequence numbers included in the route constructing frames received by the relaying devices 10 are the same. Furthermore, in FIG. 9A, a metric value in case 1 in FIG. 5 is set in the definition table. Furthermore, in FIG. 9A, metric values in case 1 in FIG. 5 are set in the definition table.

In FIG. 9A, the relaying device 10C calculates the cumulative metric value when constructing a route with the relaying device 10B by adding a metric value (54) corresponding the reception power (−48 dBm) of the route constructing frame received from the relaying device 10B to the metric value 50 included in the route constructing frame transmitted from the relaying device 10B. In this case, 50+54=104. Similarly, the relaying device 10C calculates the cumulative metric value when constructing a route with the relaying device 10B by adding a metric value (500) corresponding the reception power (−60 dBm) of the route constructing frame received from the relaying device 10A to the metric value 0 included in the route constructing frame transmitted from the relaying device 10A. In this case, 0+500=500. Therefore, the relaying device 10 finally determines the relaying device 10B with a small cumulative metric value as the relaying device 10 in a route construction target.

In FIG. 9B, the relaying device 10C calculates the cumulative metric value when constructing a route with the relaying device 10B by adding a metric value (54) corresponding the reception power (−48 dBm) of the route constructing frame received from the relaying device 10B to the metric value 50 included in the route constructing frame transmitted from the relaying device 10B. In this case, 50+54=104. Similarly, the relaying device 10C calculates the cumulative metric value when constructing a route with the relaying device 10B by adding a metric value (100) corresponding the reception power (−60 dBm) of the route constructing frame received from the relaying device 10A to the metric value 0 included in the route constructing frame transmitted from the relaying device 10A. In this case, 0+100=100. Therefore, the relaying device 10 finally determines the relaying device 10A with a small cumulative metric value as the relaying device 10 in a route construction target.

Conclusion

The embodiment described above can be described as follows.

The relaying device (fixed station) 10-1 transmits and receives a signal related to route construction, and constructs in advance an optimal route for both to perform wireless multistage relay. The relaying device (mobile station) 10-2 receives a signal related to route construction periodically transmitted by a peripheral relaying device (fixed station) 10-1, selects a relaying device (fixed station) 10-1 with favorable conditions based on its own determination, and then performs connection. Furthermore, in order to enhance stability of the wireless mesh network (wireless multistage relaying system), it is possible to make a selection such that the relaying device (mobile station) 10-2 is not connected to another relaying device (mobile station) 10-2 or a peripheral relaying device (fixed station) 10-1.

Furthermore, the embodiment described above may be described as follows.

Method where the relaying device (mobile station) 10-2 automatically selects a communication partner using a signal transmitted from a peripheral multistage relaying node (relaying device (fixed station) 10-1).

Method where selection is possible such that the relaying device (mobile station) 10-2 is not connected to another relaying device (fixed station) 10-1 or another relaying device (mobile station) 10-2 in consideration of route stability.

Method of constructing a route characterized by the following:

(1) A definition table indicating a correspondence between reception power and a metric value is constructed in the kernel space.

(2) A value of the definition table is updated at a constant cycle by a self-learning algorithm in consideration of radio wave intensity fluctuation, amount of data relayed by the relaying device 10, or the like, using the user application 200.

(3) Reception power greatly varies, and therefore, the reception power is averaged prior to referencing the definition table in Linux Kernel 210.

(4) Averaging is performed using mathematical equations, and used as a primary filter.

(5) If an averaged reception power is set as Pave_old, a measured reception power is set as Pnow, and averaged number is set as N, a new Pave is calculated by the following equation.

$$P_{ave}=(P_{ave\_old}\times(N-1)+P_{now})/N$$

(6) While referring to the definition table, a metric value corresponding to the averaged reception power Pave is acquired.

Effect in the embodiment described above, calculation of a measured value did not use a metric value determined based on a theoretical maximum communication speed when communicating with the relaying device 10, but used a Metric determined based on a reception power intensity of radio waves transmitted from the relaying devices 10. In general, as the reception power of radio waves increases, communication quality improves. Therefore, in the present embodiment, a route is constructed with a route having a more favorable communication quality as compared to a conventional method according to IEEE 802.11s. Therefore, more optimal route construction can be performed in a wireless mesh network.

Furthermore, route construction can be achieved in an arbitrary form to match a use environment by using the method according to the present embodiment. For example, a definition table having a tendency to be connected with the relaying device 10 having a certain level of radio wave intensity (pattern 1) or a table having a tendency to be connected with a remote relaying device although the reception power is weak (pattern 2) is prepared as shown in FIG. 5. For example, the definition table is changed to match a form of the relaying device 10, such as pattern 1 being used in the relaying device (fixed station) 10-1, and pattern 2 being used in the relaying device (mobile station) 10-2, or the like. Therefore, route construction can be flexibly performed.

Other

The embodiment described above is used to facilitate understanding of the present invention, and the present invention is not meant to limit the present invention. Flowcharts, sequences, elements included in the embodiment, arrangements, material, conditions, shapes, sizes, and the like thereof described in the embodiment are not limited to those exemplified and can be appropriately changed. Furthermore, configurations shown in different embodiments can be partially substituted or combined with each other.

DESCRIPTION OF CODES

1 . . . Wireless communication system, 10 . . . Relaying device, 11 . . . CPU, 12 . . . Storing device, 13 . . . Communication IF, 14 . . . Inputting device, 15 . . . Outputting device, 20 . . . Terminal, 30 . . . Internet, 100 . . . Storing part, 101 . . . Receiving part, 102 . . . Measuring part, 103 . . . Calculating part, 104 . . . Determining part, 105 . . . Relay processing part, 106 . . . Broadcasting part, 107 . . . Terminal communicating part, 200 . . . User application, 210 . . . Linux kernel, 220 . . . Wireless module

The invention claimed is:

1. A communication device in a communication system that supports a wireless mesh network using a wireless LAN, the communication device comprising:
a memory that stores a definition table where a reception power and a metric value are associated with each other, and a cumulative metric value; and
a processor configured to:
receive a broadcast signal transmitted from another communication device;
acquire, from the definition table, a metric value corresponding to a reception power of the received broadcast signal, and then calculate a cumulative metric value based on the acquired metric value and a metric value included in the received broadcast signal; and update the cumulative metric value stored in the memory to the calculated cumulative metric value if the calculated cumulative metric value is smaller than the cumulative metric value stored in the memory, and determine the other communication device transmitting the broadcast signal of the calculated cumulative metric value as a route construction target in the wireless mesh network.

2. The communication device according to claim 1, wherein the communication device transmits a broadcast signal containing the calculated cumulative metric value when the communication device operates as a fixed station.

3. The communication device according to claim 2, wherein the communication device does not transmit the broadcast signal containing the calculated cumulative metric value when the communication device operates as a mobile station.

4. The communication device according to claim 1, wherein the processor is configured to calculate the reception power of the received broadcast signal by adding a reception power of a broadcast signal received in the past and a reception power of a newly received broadcast signal at a predetermined ratio, the predetermined ratio configured to be set to an arbitrary ratio.

5. A communication method performed by a communication device in a communication system that supports a wireless mesh network using a wireless LAN, the communication method comprising:

storing, in a memory, a definition table where reception power and a metric value are associated with each other, and a cumulative metric value;

receiving a broadcast signal transmitted from another communication device;

acquiring, from the definition table, a metric value corresponding to reception power of the received broadcast signal, and then calculating a cumulative metric value based on the acquired metric value and a metric value included in the received broadcast signal; and updating the cumulative metric value stored in the memory to the calculated cumulative metric value if the calculated cumulative metric value is smaller than the cumulative metric value stored in the memory, and determining the other communication device transmitting the broadcast signal of the calculated cumulative metric value as a route construction target in the wireless mesh network.

6. A computer-readable non-transitory recording medium storing a program that causes steps to be performed by a communication device in a communication system that supports a wireless mesh network using wireless LAN, the operations comprising:

storing, in a memory, a definition table where reception power and a metric value are associated with each other, and a cumulative metric value;

receiving a broadcast signal transmitted from another communication device;

acquiring, from the definition table, a metric value corresponding to reception power of the received broadcast signal, and then calculating a cumulative metric value based on the acquired metric value and a metric value included in the received broadcast signal;

updating the cumulative metric value stored in the memory to the calculated cumulative metric value if the calculated cumulative metric value is smaller than the cumulative metric value stored in the memory, and determining the other communication device transmitting the broadcast signal of the calculated cumulative metric value as a route construction target in the wireless mesh network.

7. The communication device according to claim 2, wherein the processor is configured to calculate the reception power of the received broadcast signal by adding a reception power of a broadcast signal received in the past and a reception power of a newly received broadcast signal at a predetermined ratio.

8. The communication device according to claim 3, wherein the processor is configured to calculate the reception power of the received broadcast signal by adding a reception power of a broadcast signal received in the past and a reception power of a newly received broadcast signal at a predetermined ratio.

9. The communication device according to claim 1, wherein the definition table includes a first set of a reception power and a metric value, and a second set of a reception power and a metric value, and the processor is configured to acquire the metric value corresponding to the reception power of the received broadcast signal from a designated set, which is either the first set or the second set.

10. The communication device according to claim 1, wherein the definition table contains a metric value indicating that no route is created.

11. The communication device according to claim 4, wherein the predetermined ratio that is set when the communication device operates as a mobile station, and the predetermined ratio that is set when the communication device operates as a fixed station, are different.

* * * * *